April 13, 1948. A. L. W. WILLIAMS ET AL 2,439,499
PIEZOELECTRIC MOTOR
Filed Aug. 20, 1942 5 Sheets—Sheet 4

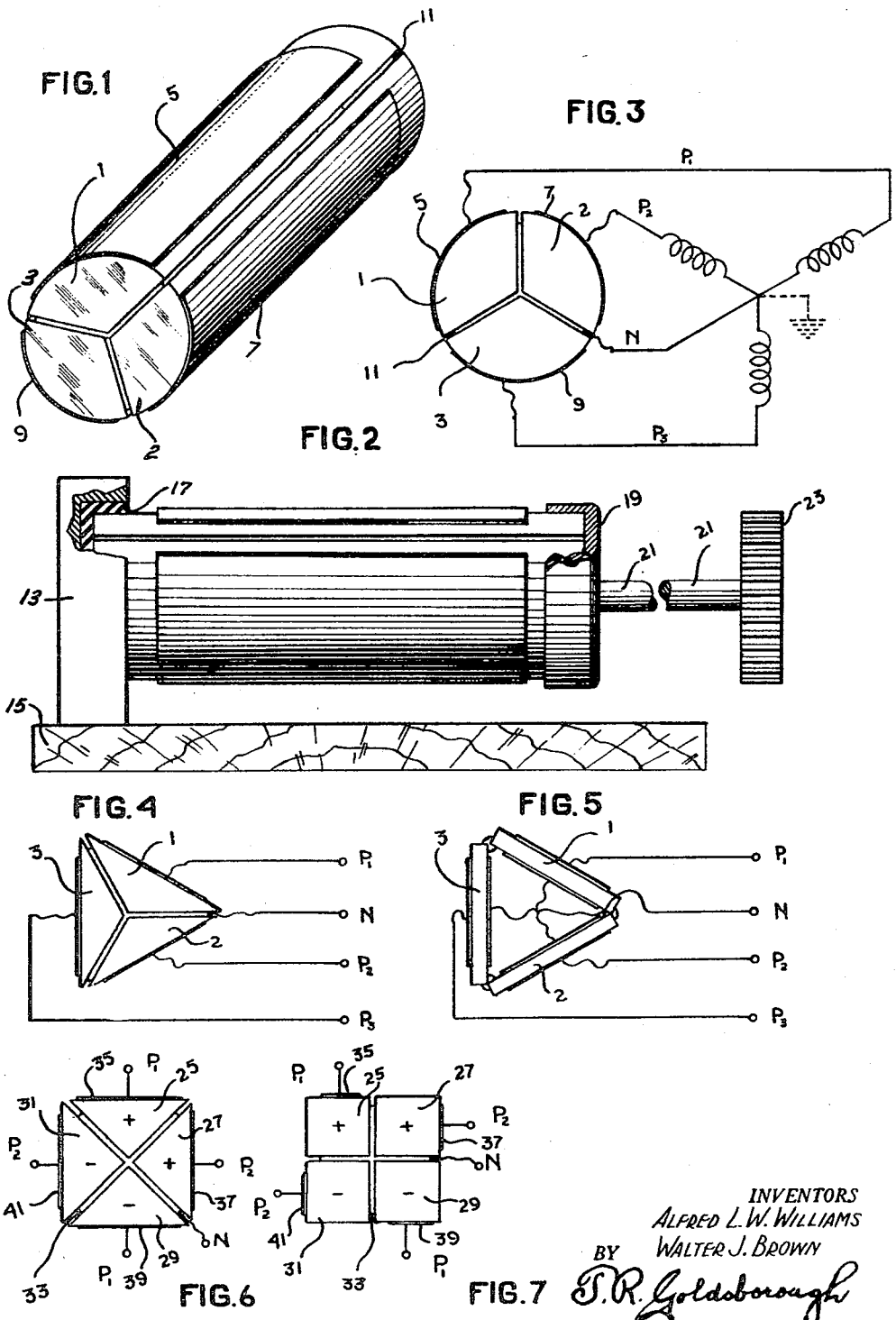

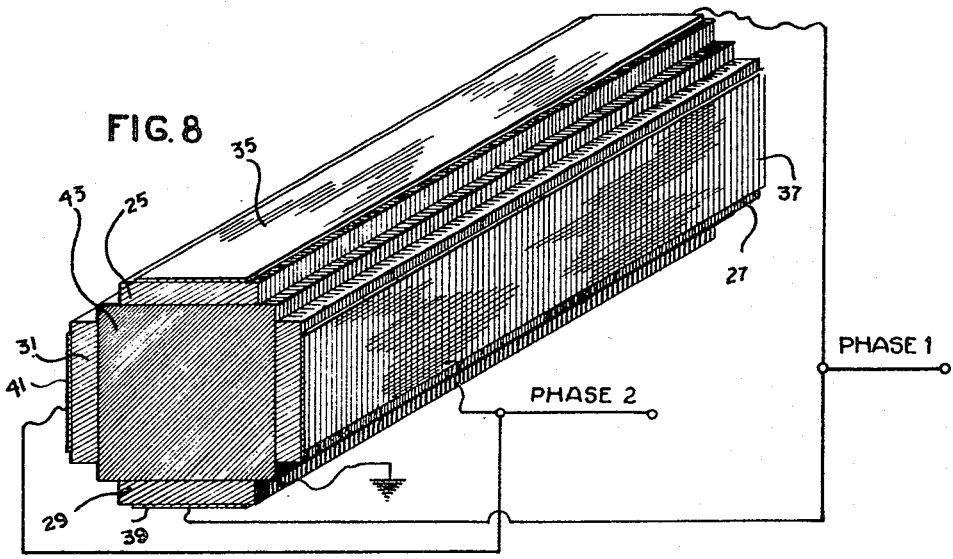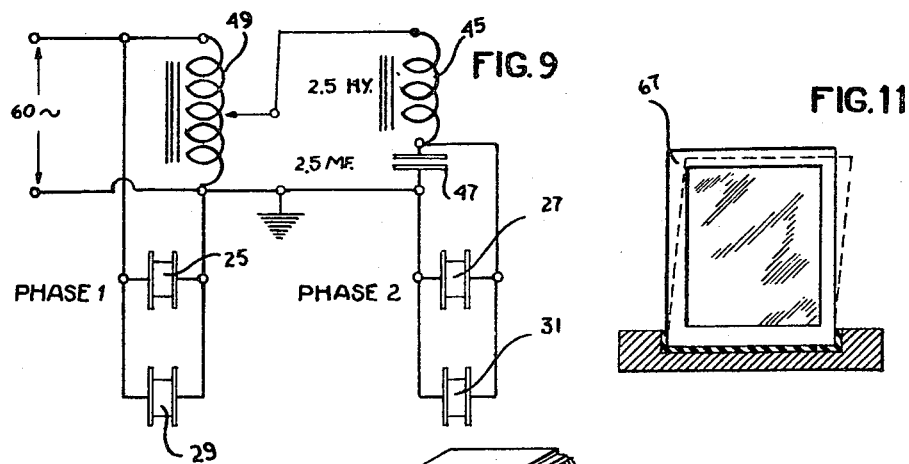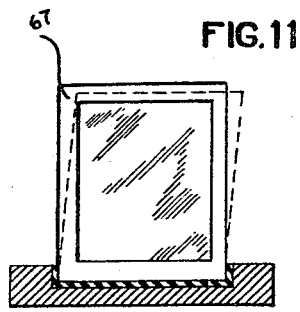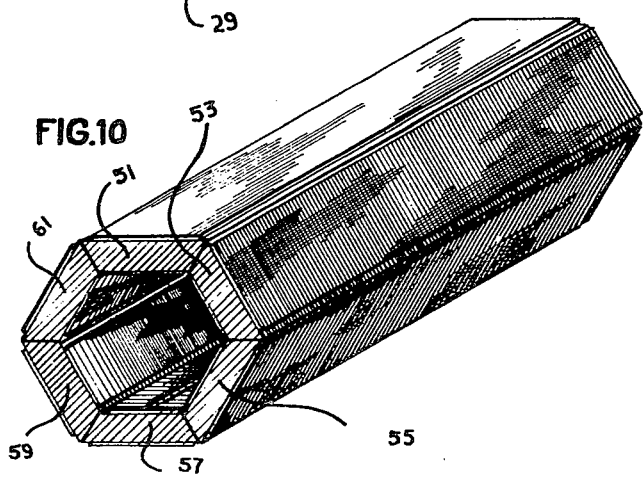

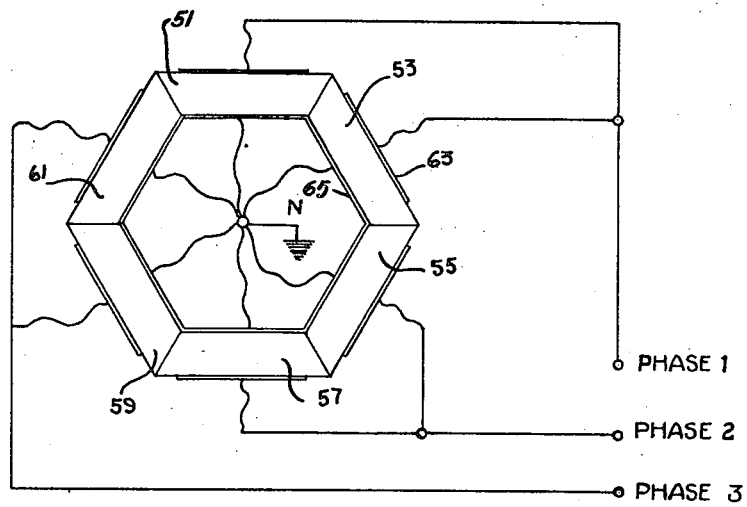
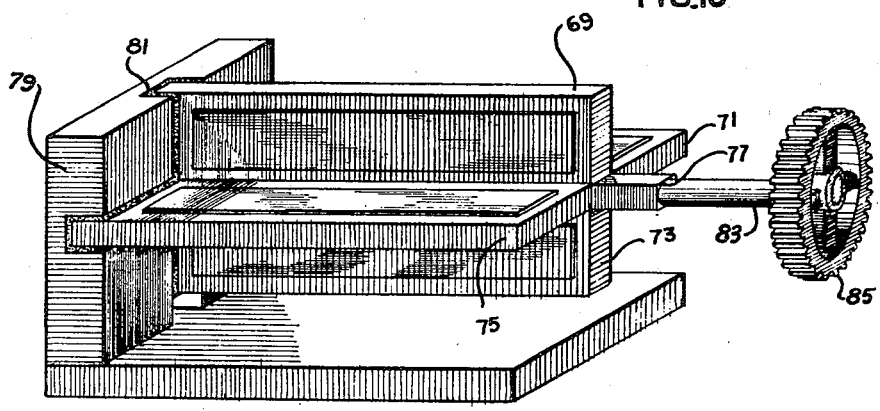
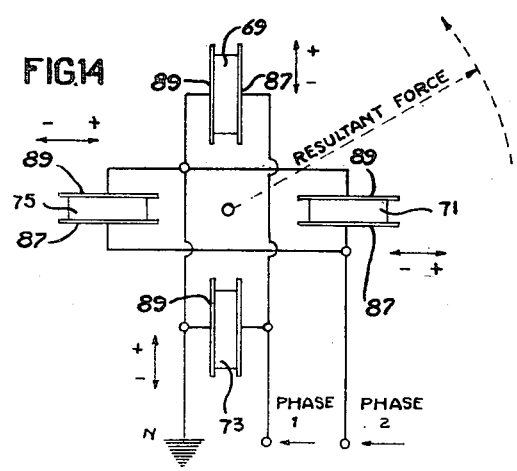

INVENTORS
ALFRED L. WILLIAMS
WALTER J. BROWN
BY T. R. Goldsborough
ATTORNEY

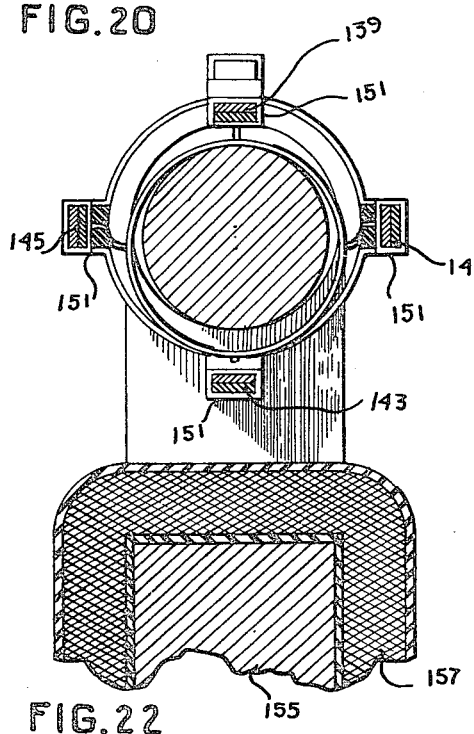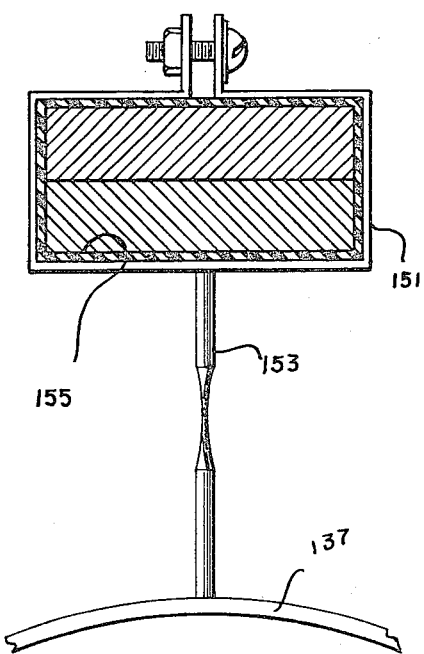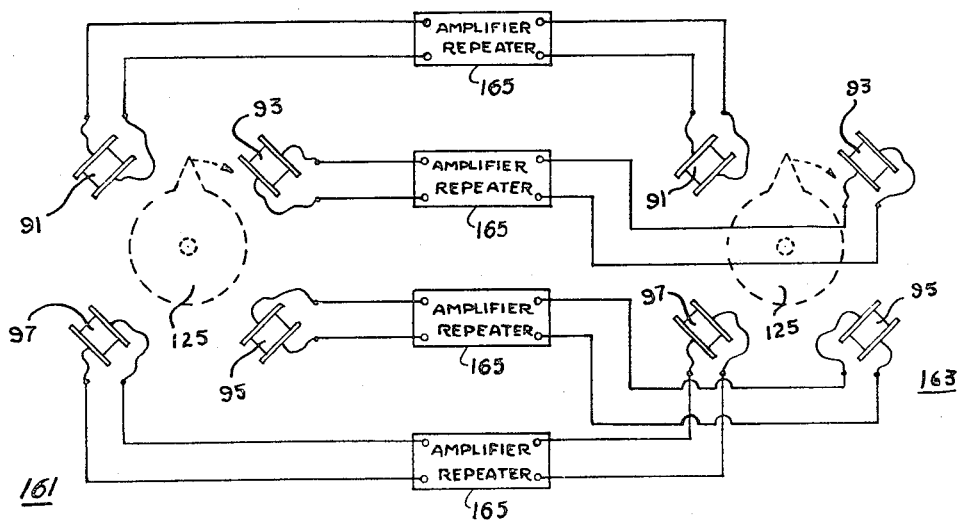

Patented Apr. 13, 1948

2,439,499

UNITED STATES PATENT OFFICE 2,439,499

PIEZOELECTRIC MOTOR

Alfred L. W. Williams and Walter J. Brown, Cleveland Heights, Ohio, assignors to The Brush Development Company, Cleveland, Ohio, a corporation of Ohio Application August 20, 1942, Serial No. 455,416

27 Claims. (Cl. 171—327)

This invention relates to piezoelectric devices and, more particularly, to methods of and means for converting polyphase electric potentials into mechanical movement through utilization of piezoelectric phenomena, and vice versa.

One object of the invention is to provide a piezoelectric crystal device responsive to polyphase electric potentials.

Another object is to provide a composite piezoelectric crystal element by means of which polyphase electric potentials may be translated into rotary mechanical motion.

Another object is to provide an electric motor wherein the actuating means is piezoelectric in character.

Another object is to provide an electric motor that shall not require commutators, slip rings or the like for conveying alternating electric potentials thereto.

Another object is to provide an electric motor wherein vibratory movement of a piezoelectric crystal element is translated into rotary motion of a driven part without the interposition of gears, ratchet wheels or the like.

Another object is to provide speed reducing means devoid of gears of conventional types.

Another object is to provide an electric motor capable of being energized from a source of high frequency alternating potential.

Another object is to provide a piezoelectric motor of the synchronous type.

Another object is to provide a piezoelectric motor that shall be substantially noiseless in operation.

A still further object is to provide a remote control system whereby angular motion may be transmitted to a remotely disposed rotatable element.

In one embodiment of the invention, polyphase electric potentials are applied to a plurality of piezoelectric crystal elements which are so arranged and interconnected that the vibratory movements thereof are translated into gyratory motion, in a circular path, of a mechanical device such as a gear wheel. The gear wheel may constitute one element of the well-known planetary gear train, whereby the gyratory motion is converted into rotary motion of a sun wheel about its own axis.

The piezoelectric elements may be bonded together to constitute a composite element and suitable electrodes may be affixed thereto whereby, when the element is fixed at one end, the free end may be caused to gyrate in response to the application of polyphase electric potentials.

Alternatively, the elements may be angularly spaced apart around the gyratory axis, the crystallographic axes of the elements, along which expansion occurs, being disposed parallel or in angular relation to the said gyratory axis.

In a preferred embodiment of the invention, the gyratory member takes the form of a ring that encircles a shaft to which rotary motion is to be imparted. The shaft is supported in fixed bearings having a slight clearance, and it is caused to roll around the interior walls of the bearings without slip, under compulsion from the gyrating ring. In that form of the invention, multiplate flexing elements of the bender type may be employed or piezoelectric drivers of the type disclosed in the United States patent to A. L. W. Williams, No. 2,278,966, may be used.

The novel features considered characteristic of the invention are set forth with particularity in the appended claims. The invention itself, however, both as to its organization and its method of operation, including further details, objects and advantages thereof, will be understood best from the following description of certain specific embodiments, when read in connection with the accompanying drawings, in which:

Figure 1 is a view in perspective of a three-section multiplate flexing crystal element constructed according to the invention;

Figure 2 is a view in side elevation exemplifying the utilization in a motor of a composite crystal element such as is shown in Figure 1;

Figure 3 is a circuit diagram showing the manner in which the three-section multiplate flexing element electrodes may be connected to a source of three-phase potential;

Figure 4 is an end view of a modified three-section multiplate flexing element that is somewhat easier to manufacture than the three-section multiplate flexing element shown in Figure 1;

Figure 5 is an end view of a three-section multiplate flexing element assembled from crystal sections of the conventional expander type;

Figure 6 is an end view of a four-section multiplate flexing element constructed according to the invention and adapted to be energized from a source of two-phase potential;

Figure 7 is an end view of an alternative form of a four-section multiplate flexing element;

Figure 8 is a view in perspective exemplifying a still further modification of the invention whereby the action of a four-section multiplate flexing element may be obtained.

Figure 9 is a circuit diagram exemplifying the manner in which two-phase potential for energizing a four-section multiplate flexing element may be obtained from a single phase source;

Figure 10 is a view in perspective of a composite piezoelectric crystal element comprising six expander sections, or a six-sided multiplate flexing element.

Figure 11 is a diagrammatic view exemplifying the shear mode of vibration of a piezoelectric crystal section of the X-cut type;

Figure 12 is an enlarged and conventionalized end view of a six-sided multiplate flexing element, of the type shown in Figure 10, which illustrates diagrammatically one mode of energization and operation thereof;

Figure 13 is a perspective view of a piezoelectric gyrator wherein the crystal sections vibrate in a shear mode when suitable potentials are applied to the surface electrodes affixed thereto;

Figure 14 is a diagrammatic view exemplifying the operation of the device illustrated by Figure 13;

Figure 18:
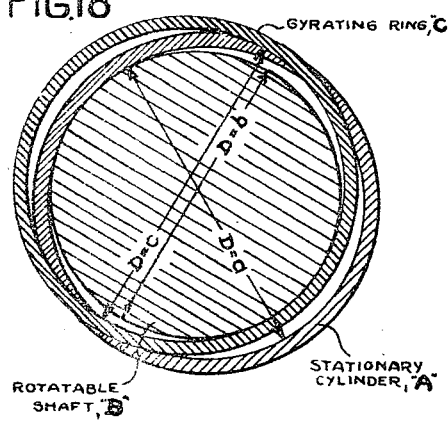
Figure 19:
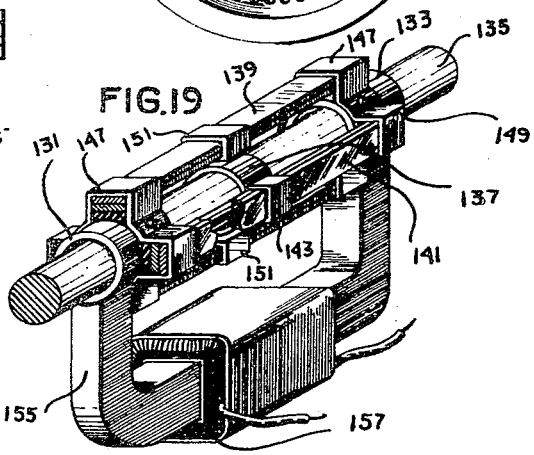

Figures 18 and 19 exemplify an alternative embodiment of the invention;

Figure 20 is an enlarged fragmentary vertical cross-sectional view of the device illustrated by Figure 19;

Figure 21 is an enlarged detailed view of a portion of the device shown in Figure 19, and Figure 22 is a diagram exemplifying the application of the invention to a remote control system.

In all figures of the drawing, identical elements are similarly designated.

Referring now to Figure 1 of the drawing, a three-section multiplate flexing element constructed according to this invention may comprise three elongated cylindrical piezoelectric crystal sections or cylindrical sectors 1, 2 and 3, so cut from a mother crystal that their long axes are substantially parallel to the Y—Z plane and are inclined at an angle of the order of 45° to the Y axis. As shown in Figures 1, 2 and 3 of the drawings, the curved surface of each section subtends an angle of substantially 120° and the three sections, when fitted together, form an elongated rod-like composite piezoelectric unit. Each section is provided with an individual outer electrode 5, 7 and 9, and the sections may be cemented together in contact with a central electrode 11 common to all three sections.

Each section is so chosen that it tends to expand longitudinally when the outer electrode thereof is positive with respect to the common central electrode, and to contract when the outer electrode is negative, or vice versa. Such being the case, because of the fact that the sections exert a mutual restraining action, if the three-section multiplate flexing element is connected to a source of three-phase potential as shown in Figure 3, one end of the composite element being held fixed in position, the free end will gyrate in a circular path in a plane substantially normal to the long axis. For the purpose of utilizing the gyratory movement, apparatus such as is illustrated by Figure 2, may be employed.

As shown in Figure 2, one end of a three-section multiplate flexing element may be held fixedly by suitable means provided, for example, by a massive block 13 supported upon a base 15 having a recess in one face thereof wherein the said end is anchored by insulating material 17. The free end of the element may be provided with a suitable cap 19 or the like from which a shaft 21 carrying a gear wheel 23 may project. The gear wheel may mesh with internal teeth on a sun-wheel (not shown), as in the usual planetary drive whereby, when suitable three-phase potentials are applied to the electrodes of the element, the gyrating gear wheel 23 carried by the shaft imparts rotary motion to the said sun-wheel in the well-known manner. Through proper choice of the gear ratio, substantially any desired speed reduction may be obtained, the gyration of the planet gear always bearing a synchronous relation to the frequency of the energizing potential source.

It is to be understood that no figure of the drawings is drawn to scale. All dimensions have been purposely exaggerated for illustrative purposes. In actual apparatus, the relative dimensions of the crystal elements and of other devices connected thereto may depart materially from those shown in the drawing, depending upon the use to which the said apparatus is to be put.

Instead of employing crystal sections formed as sectors of a cylinder, such as shown in Figure 1, the sections may be triangular in cross section as exemplified by Figure 4, or they may be given such other configuration as is compatible with the spirit and purpose of the invention.

Further, in accordance with the invention, three elongated crystal sections, rectangular in cross section, may be employed and the long edges thereof may be cemented together as shown in Figure 5 to form a three-section multiplate flexing element.

The invention is not limited to the utilization of three sections only of piezoelectric material, for three-phase excitation, but the principle thereof is broad enough to cover all composite elements constituted by a plurality of sections so joined together for mutual constraint, or so affixed to a common supporting device such as a rod, bar or the like and so provided with electrodes that a free end thereof may be caused to gyrate in response to the application of polyphase electric potentials or appropriately commutated unidirectional potentials.

For example, for two-phase actuation, a four-section multiplate flexing element, such as exemplified by Figures 6 and 7, may be employed. Such a device may be constituted by four elongated piezoelectric crystal sections 25, 27, 29 and 31 of the expander type cemented together around and in contact with a common central electrode, each section being supplied with an outer electrode 35, 37, 39 and 41 individual thereto. In the drawing, the plus and minus signs have no electrical significance; they are indicative only of the physical behavior of the members of the pairs of diametrically opposite sections, 25—29 and 27—31. That is to say, when the electrodes of the pairs of sections are connected, respectively, to phase 1 and phase 2 of a two-phase source, as indicated in the drawing, one member of a pair tends to shorten, indicated by the minus sign, and the other member tends to lengthen when potential of the same polarity is applied to both members. The strains set up in the element, therefore, are in quadrature and one end thereof will gyrate in a circular path upon the application of two-phase potentials provided the other end is held fixed in position as described in connection with Figure 2.

Alternatively, as shown in Figure 8, instead of cementing the expander sections together, they may be affixed to the sides of a rectangular bar 43 of any suitable conducting or non-conducting material. If the bar is conducting, it serves as the common electrode for the sections; if the bar is non-conducting, each section must be provided with at least two surface electrodes.

The last described embodiment of the invention bears a superficial resemblance to the piezoelectric filter disclosed in the United States patent to Mason, No. 2,271,200. The purpose and function of the four-section multiplate flexing element, however, are totally distinct from those of the patentee's apparatus.

If two-phase potential is not available it may be derived, for example, as shown in Figure 9, from a commercial source of 60 cycle potential, by connecting a phase shifting network, comprising an inductor 45 and a capacitor 47, across the source and utilizing the potential of the source and the potential across the capacitor, respectively, as the excitation potentials for the four-section multiplate flexing element.

For most efficient operation, the phase-shifting network may be tuned to the frequency of the source. For example, when the source supplies potential at a frequency of 60 cycles, the inductor may have an inductance of 25 henrys and the capacitor a magnitude of 25 mf., and phase 2 lags phase 1 by substantially 90°.

To prevent the phase shifting network from drawing a destructive amount of current from the line it is considered best to impress upon it a potential lower than line potential. For that purpose, an auto transformer 49, as shown, may be utilized.

In devices constructed and arranged in accordance with the foregoing descriptions and descriptions of modifications hereinafter given, for greatest efficiency it is expedient to so choose the various elements that the entire system is electrically and mechanically resonant to a given frequency, and to supply potentials at the frequency of resonance thereto.

The only limitations with respect to frequency are those imposed because of the inertia of the moving parts.

Furthermore, the invention includes all composite units constituted by a plurality of piezoelectric crystal sections so cemented together for mutual constraint, or so cemented to a common supporting rod, bar or the like, that their conjoint action, when properly supplied with polyphase potentials, or commutated unidirectional potentials, is to produce gyratory movement rather than the bending or twisting movement of the well-known multiplate flexing element.

For example, referring to Figures 10 and 12, the invention may take the shape of a six-sided multiplate flexing element composed of six piezoelectric crystal sections, 51, 53, 55, 57, 59 and 61 each of the 45° X-cut type, cemented together to form a hexagonal bar. Each of the sections may be trapezoidal in cross-section, and the long edges may be chamfered at an angle of 60° whereby they may be fitted together as shown to form a rod. An outer electrode 63 and an inner electrode 65 are affixed to each section and all of the inner electrodes may be conductively connected together. If each of the sections is so cut as to expand longitudinally upon the application of positive potential to the outer electrode thereof, the composite unit may be energized from a source of three-phase potential as illustrated by Figure 12. When so energized, one end of the unit being clamped, the free end will gyrate in a substantially circular path in the same manner as was explained in connection with Figure 1.

Many other modes of assembling a plurality of crystal sections and of applying activating potentials to the composite unit may be devised without departing from the spirit of the invention. As an example, instead of supplying polyphase alternating potentials to the electrodes a source of unidirectional potential may be employed and a rotating or other commutator may be utilized for so sequentially and successively activating the crystal elements that the action of polyphase potentials is simulated. Such modification of the invention is believed to be sufficiently obvious to one skilled in the art as to require no illustration. In addition, shear plates could replace expander plates in earlier described constructions, for example, in the rod-like three-section multiplate flexing element.

Also, it is not believed necessary to illustrate and describe in detail the many possible variants of the composite structures themselves, it being obvious that the number of sections may be increased substantially indefinitely provided that they are properly chosen and are supplied with polyphase or other potentials in such manner that gyratory movement is obtained.

The invention may also be practiced by employing a plurality of plain X-cut Rochelle salt crystal sections, or the like, of the type exemplified by Figure 11. If one edge of such a section is clamped, as explained in the United States patent to C. B. Sawyer, No. 1,802,780, and potential applied thereto parallel to the X-axis, there results a shear movement of the opposite edge which is denoted by the dotted line in the figure.

As shown in Figure 13, four sections, 69, 71, 73 and 75, of the type illustrated by Figure 11, may be assembled in the form of a cross, a long edge of each section being cemented or otherwise affixed to the sides of a flexible rectangular shaft 77, and one end of the assembly being held firmly against movement in a channeled mounting block or the like, as by the use of insulating cement 81 such as a liquid phenolic resin (Bakelite). The free end 83 of the shaft may be provided with a gear wheel 85 or the equivalent, as was described in connection with Figure 2. Alternatively, the central shaft may be omitted, in which modification the edges of the sections may be cemented directly to each other and the gear wheel may be affixed to the free end of the assembly by any suitable means such as a cap.

Each crystal section may be provided with two electrodes, a high potential electrode 87 and a low potential, or grounded electrode 89 as may be understood more clearly from an inspection of Figure 14. The high electrodes 87 of one pair of diametrically opposite sections may be connected to phase 1 of a two-phase potential source and the high electrodes of the other pair connected to phase 2.

The orientation of each section, with respect to the crystallographic axes of the mother crystal, is such that the free ends of each pair tend to move in unison radially in the same direction toward and away from a reference axis colinear with the rest position of the axis of the shaft when potentials of the same polarity are impressed upon the high electrodes of the pair with respect to ground. The movement of the ends is indicated by the double headed arrows in Figure 14 adjacent the ends of which, respectively, will be noted plus and minus signs. If two-phase potentials, therefore, are applied to the electrodes there is set up what might be termed an instantaneous resultant force that acts radially upon the free ends of the sections, which force rotates around the reference axis, as illustrated by the dotted lines. The gear wheel 85 carried by the shaft gyrates in a plane substantially normal to the reference axis and, because of the fact that the sections do not differentially contract and expand longitudinally thereof, as is the case with the multisided flexing elements hereinbefore described, there is substantially no tendency for the gear wheel to "wobble" during its gyration.

The gyration of the gear wheel may be utilized as desired. For example, rotary motion may be imparted to a sun wheel or the like in the manner described in connection with Figure 2, or the gyration may be utilized to impart intermittent linear motion to a driven part through the employment of any well-known mechanical expedient.

Inasmuch as the invention, in its broadest aspect, is concerned with the derivation of gyratory motion from a plurality of piezoelectric elements, it lies within the scope thereof to substitute a separately mounted and energized element for each of the sections constituting one of the described multisided flexing elements, or a variant thereof, and to provide interconnecting means between the separate elements whereby they conjointly impart movement to a driven member.

Figure 15:
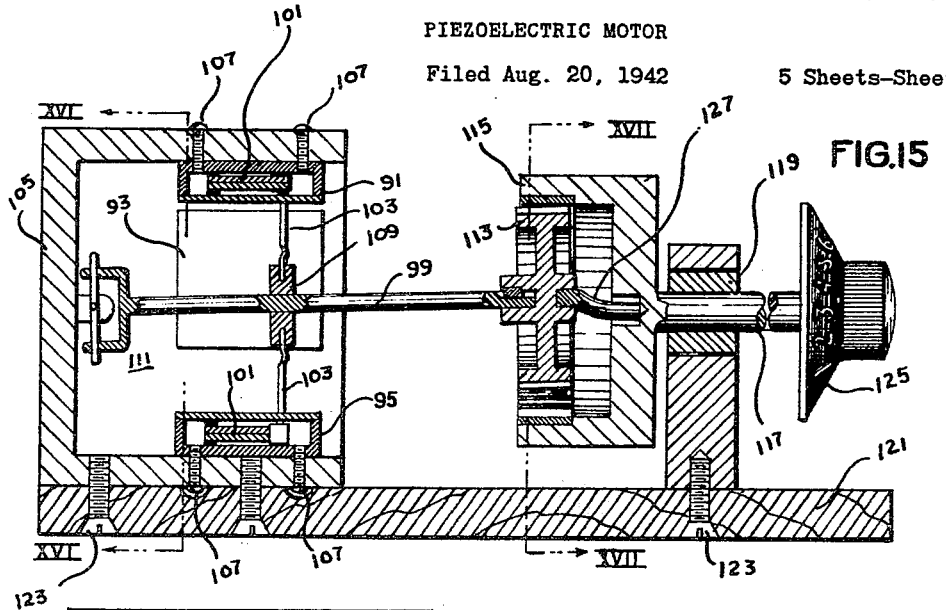
Figure 15 is a vertical cross-sectional view of an alternative embodiment of this invention.
Figure 16:
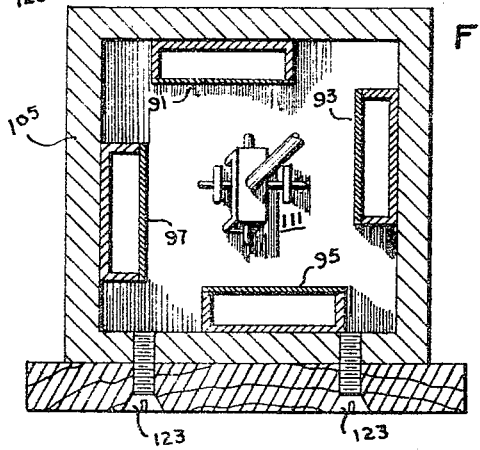
Figure 16 is a vertical cross-sectional view of the device taken along a line corresponding to the line XVI—XVI in Figure 15.
Figure 17:
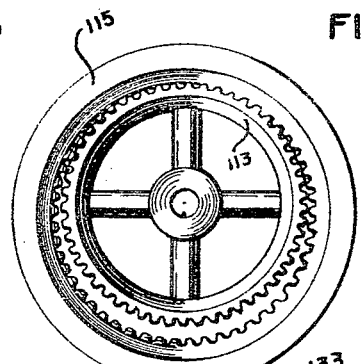
Figure 17 is a vertical cross-sectional view of the device taken along a line corresponding to the line XVII—XVII in Figure 15.

For example, the action of a four-section multiplate flexing element may be duplicated by the apparatus exemplified by Figures 15, 16 and 17. Such apparatus may comprise four piezoelectric motors, 91, 93, 95 and 97 of the type shown and described in the United States patent to A. L. W. Williams, No. 2,278,966, spaced apart 90° around a shaft 99 to which gyratory motion is to be imparted. Details of the motors have been omitted from Figure 15, but it is to be understood that each comprises a multiplate flexing element 101 mounted within a suitable housing, provided with electrical leads (not shown) and having a drive rod 103. The motors may be mounted within a suitable supporting device such, for example, as a cup-shaped metallic casting 105, by a plurality of screws 107 or the like and the drive rods 103 project inwardly and are affixed to a collar 109 keyed or otherwise mounted on the gyratory shaft 99.

One end of the shaft may be supported within the cup-shaped casting by a universal joint, indicated in its entirety by the numeral 111, while the other end thereof may be provided with a gear wheel 113 that meshes with the internal teeth on a sun wheel 115 having a shaft 117 mounted for rotation in a bearing 119 supported from a base 121 to which the cup-shaped casting 105 also may be affixed. A plurality of studs 123 or the like, may be utilized for maintaining the casting and the bearing standard firmly affixed to the base.

The projecting, or free end of the shaft 117 is illustrated as being provided with a dial 125 having numerals printed or otherwise impressed thereon. The purpose of the dial, hereinafter, will be explained.

In the drawing, a bent spindle 127 is shown interposed between the gear wheel carried by the shaft 99 and the sun wheel 115, one end of the spindle being rotatably mounted in a bearing in the gear wheel and the other end being provided with a bearing in the base of the sun wheel, concentric with the shaft thereof.

In operation, the piezoelectric motors are supplied with two-phase potentials as previously described with respect to other figures of the drawings and the gear wheel carried by the shaft is caused to gyrate around the interior of the sun wheel without rotating around its own axis. Rotary motion, therefore, is imparted to the sun wheel 115 about its axis and, in accordance with known principles of mechanics, almost any desired speed reduction may be obtained.

By employing three piezoelectric motors, spaced 120° around the gyratory shaft, which motors are supplied with three-phase potential, the action of a three-section multiplate flexing element may be duplicated and, as is well understood by the inventors, many other modifications will suggest themselves to those skilled in the art.

Furthermore, it lies within the scope of the invention to employ the mechanism exemplified by Figures 18, 19, 20 and 21 of the drawings. As illustrated, the device may comprise a plurality of cylindrical bearings 131 and 133 the inside diameter of which is slightly larger than a shaft 135 which extends through them and is supported therein for rotary motion. A ring 137 of non-magnetic material, such as brass, encircles the shaft intermediate the bearings, the internal diameter of the ring being the same as that of the bearings. Four multiplate flexing elements 139, 141, 143 and 145 of the bender type are spaced apart 90° around the shaft, the ends of each of the multiplate flexing elements being firmly attached to the exterior of the bearings by an suitable means such, for example, as an encircling metallic band 147 which is held to the bearing by a plurality of bolts or screws 149.

Intermediate its fixed ends, each multiplate flexing element is provided with an encircling band 151 from which a drive rod 153 extends inwardly toward and is affixed to the ring 137. A layer of semi-resilient material may be interposed between the band and the crystal element, to provide accommodation for the flexing of the latter when it vibrates. The inner ends of the drive rods are affixed to the ring by any suitable means such as soldering or riveting, and each rod is slightly flexible tangential of the ring.

The bearings 131 and 133 are fabricated from a magnetically permeable material such as iron or mild steel and are mounted, respectively, upon the ends of an U-shaped permeable element 155 provided with a winding 157 through which direct current may be caused to flow.

In operation, the shaft 135, which should be fabricated from a metal having high permeability, completes the magnetic path and adheres to the inner walls of the bearings. Alternatively, the shaft may be of a metal having high retentivity and be permanently magnetized.

When two-phase potentials are applied to the multiplate flexing element by suitable connections (not shown) they impart gyratory motion to the ring 137 with the result that the shaft is caused to roll around the interior walls of the bearings, the magnetic attraction between shaft and bearings serving to prevent any slip therebetween.

Referring particularly to the diagram of Figure 18, if it is assumed that there is no slip between the shaft B, which has an external diameter "b," and the stationary bearings, indicated by the element A, that have an internal diameter "a," during each gyration of the shaft under compulsion from the ring c, the shaft revolves around its own axis $1-a/b$ times.

In the event that total absence of "slip" is required, the ring and bearings may be provided with very fine internal teeth by a broaching operation or the like, and the shaft may be provided with external teeth meshing therewith. Accordingly, substantially any desired speed reduction may be obtained and the shaft may be caused to rotate relatively slowly even though the driving crystal units are supplied with potentials at high frequencies. Inasmuch as the gyratory motion of the ring is synchronous with the periodicity of the potential source, the rotation of the shaft may be caused also to bear a synchronous relation thereto.

Alternatively, piezoelectric motors of the type shown in Figure 15 may be employed for imparting gyratory motion to the ring, or piezoelectric elements of any other suitable type may be utilized in lieu thereof.

As also mentioned in connection with Figure 15, the embodiment of the invention exemplified by Figure 19 may be adapted to three-phase operation by employing three piezoelectric elements spaced 120° apart around the reference axis which, in the last named figure, is the axis of the cylindical bearings.

Substantially any one of the described embodiments of the invention may be utilized for the purpose of adjusting the angular position of a remotely disposed device such, for example, as the shaft carrying the rotor (not shown) of a tuning capacitor, a rheostat, or the like. A remote control system is exemplified by Figure 22 of the drawings and may comprise control mechanism, indicated generally by the numeral 161, and remote controlled mechanism, indicated generally by the numeral 163. The mechanisms may be of the type exemplified by Figure 15, and each crystal motor of the control mechanism may be connected to the corresponding motor of the controlled mechanism through an individual amplifier or repeater 165.

Angular movement of the dial 125 of the control mechanism causes the crystal motors therein to develop potentials which, after amplification, are sequentially impressed upon the corresponding motors in the controlled mechanism and, thereat, impart rotary movement of definite angular extent to the controlled device. If the amplifiers are of the two-way type, such as telephone repeaters, the action is reversible. It is also to be understood that the amplifiers 165 may be omitted if the controlled apparatus does not require very much torque for its actuation.

In connection with Figure 22, it should also be understood that multisided flexing elements may be interconnected in substantially the same mannner for remote actuation and control, as may also embodiments of the invention described in connection with Figure 19.

Numerous other applications for the multisided flexing elements disclosed herein will be apparent to those skilled in the art to which the invention pertains, as well as many additional modifications of the specific devices illustrated and described. The invention, therefore, is not to be limited except insofar as is necessitated by the prior art and by the spirit of the appended claims.

What is claimed is:

1. A device for translating electrical potentials into gyratory mechanical motion, comprising a plurality of juxtaposed piezoelectric crystal elements each having an identifying face fixed substantially in parallel to a common reference axis, the faces being angularly spaced apart around the axis, each element having a mechanical axis effectively in parallel to its identifying face and an electrical axis effectively normal to said face, each identifying face being provided with an electrode; the said mechanical axes being so correlated to the reference axis and the elements being so interconnected for conjoint movement that one portion of the device may be caused to gyrate around the reference axis upon the application of cyclically varying potentials to the electrodes in succession while the opposite portion of the device along the reference axis is restrained against movement with respect to said axis.

2. The invention set forth in claim 1, characterized in this: that the crystal elements are of the Rochelle salt type.

3. The invention set forth in claim 1, characterized in this: that the mechanical axis of each crystal element is substantially parallel to the reference axis.

4. The invention set forth in claim 1, characterized in this: that the mechanical axis of each crystal element is angularly related to the reference axis.

5. An elongated piezoelectric crystal element of the expander type, the cross-section of which in a plane substantially normal to the mechanical axis thereof is substantially triangular, and electrode means on a face thereof which is substantially parallel to the said mechanical axis.

6. An elongated piezoelectric crystal element of the expander type the cross-section of which in a plane substantially normal to the mechanical axis is substantially sector-shaped, and electrode means on a face thereof which is substantially parallel to the said mechanical axis.

7. An elongated piezoelectric crystal element of the expander type the cross-section of which in a plane substantially normal to the mechanical axis is substantially trapezoidal.

8. A device for translating electrical potentials into gyratory mechanical motion, comprising at least three elongated piezoelectric crystal elements of the expander type so symmetrically disposed around a common reference axis that their mechanical axes are substantially parallel to the reference axis and their electrical axes are angularly related to said axis, each of said elements having a surface electrode individual thereto.

9. The invention set forth in claim 8, characterized in this: that the crystal elements are constituted by sections formed from a crystal of a salt of tartaric acid.

10. As an article of manufacture, a device for translating electrical potentials into gyratory motion, comprising at least three elongated piezoelectric crystal elements bonded together for mutual constraint, the said elements being angularly spaced apart around a reference axis, each element having electrode means individual thereto.

11. A composite piezoelectric unit constituted by at least three crystal sections of the expander type effectively bonded together for mutual constraint along a common axis, the electrical axes of said sections, respectively, being angularly spaced apart around said axis, and electrodes for applying across each of said sections an electrical potential along the electric axis thereof, whereby, if one end of said composite unit is restrained the free end thereof may be caused to gyrate around the said axis by the application of polyphase electric potentials to said electrodes.

12. In combination, a member adapted to gyrate around an axis, a plurality of piezoelectric crystal elements for converting electric energy into vibrational motion of themselves and gyratory movement of said member, a revolvable device and means for deriving a torque from said member and for applying said torque to said revolvable device to cause it to rotate.

13. In an electric motor, a member adapted to gyrate around an axis, at least three piezoelectric crystal elements symmetrically disposed around said axis, means for translating vibratory motion of said elements into gyratory motion of said member, a revolvable part, and means for translating the gyratory movement of said member into rotation of said revolvable part.

14. The invention set forth in claim 13, characterized in this: that the piezoelectric crystal elements are spaced 90 degrees apart around the axis.

15. The invention set forth in claim 13, characterized in this: that the piezoelectric crystal elements are spaced 120 degrees apart around the axis.

16. The invention set forth in claim 13, characterized in this: that the piezoelectric crystal elements are so symmetrically spaced around the axis that they may be energized for conjoint action from a source of cyclically varying electric potentials.

17. The invention set forth in claim 13, additionally characterized in this: that the crystal elements are bonded together into a composite unit for mutual constraint.

18. In an electric motor, a plurality of piezoelectric crystal sections the expansion axes of which lie in planes at angles to each other and substantially parallel to a common reference axis, the electrical axes of the sections, respectively, being angularly spaced apart around said common axis, each section having an electrode whereby an electrical potential may be applied thereto along the electrical axis thereof, one portion of each section being fixed in position with respect to the common axis and another portion thereof being capable of radial movement with respect to said axis in response to electrical potentials, the movable portions of said sections being mechanically interconnected by an element that partakes of the movement of each section to be caused thereby to gyrate in a substantially circular path upon the application of polyphase potentials to the said sections.

19. In an electric motor, a planet-wheel having external gear-teeth, a sun-wheel rotatable about an axis and having internal gear-teeth with which mesh the teeth on the planet wheel, and a plurality of piezoelectric crystal sections for causing the planet wheel to gyrate around said axis, without angular rotation, in such a path that a minor number of its teeth are always in mesh with the teeth of the sun-wheel.

20. In an electric motor, a rotatable shaft, a cylindrical bearing for said shaft, and a plurality of electrostatic elements for causing said shaft to gyrate around the interior surface of said bearing without appreciable slip, whereby rotary motion about its own axis is imparted to said shaft.

21. In an electric motor, a rotatable shaft, a cylindrical bearing, in which said shaft is disposed, the said bearing having an internal diameter greater than the diameter of the shaft, and a plurality of electrostatic elements for causing the shaft to gyrate around the axis of the bearing in contact with the inner surface thereof without appreciable slip, whereby the shaft is caused to revolve about its own axis.

22. The invention set forth in claim 21, characterized in this: that the means for causing the shaft to gyrate includes a ring encircling the shaft and the said plurality of electrostatic elements cause the ring to gyrate around the shaft in forcible contact therewith.

23. In an electric motor, a rotatable element, a substantially cylindrical member within which said element is supported, means for causing the rotatable element to adhere to the inner wall of the cylindrical member, and means for causing the rotatable element to bodily gyrate around the axis of the cylindrical member, whereby the said element is caused to revolve around its own axis at an angular velocity proportional to the difference between its outside diameter and the inside diameter of the cylindrical member.

24. In combination, a plurality of piezoelectric crystal element means each adapted to convert electrical energy into a straight-line mechanical motion of itself and so connected together that the resultant motion of their several motions is a gyratory motion about an axis, a member connected to said plurality of element means and adapted to be driven thereby in a gyratory motion about an axis, a revolvable device, and means for deriving a torque from said member and for applying said torque to said revolvable device to cause it to rotate.

25. In an electric motor, a plurality of piezoelectric crystal element means symmetrically disposed around an axis and each adapted by itself to convert electrical energy into a straight-line vibratory mechanical motion of itself, means for mechanically linking each of said plurality of crystal element means together, and means for connecting said plurality of crystal element means to a polyphase electrical supply line whereby the resultant motion of the plurality of linked vibrating crystal element means is a gyratory motion about the axis.

26. A unitary electrostatic structure comprised of a plurality of electrostatic elements each having electrodes, each of said elements being adapted to move in a plane when it is subjected to an electric field between its electrodes, means connecting said plurality of elements together with their planes of movement angularly related to each other so that each element upon moving under the influence of said electric field moves each of the elements to which it is connected out of its normal plane of movement.

27. The invention set forth in claim 26 further characterized by a source of polyphase voltage, one for each of said electrostatic elements, whereby upon excitation by said polyphase voltage at least a portion of said electrostatic structure gyrates.

ALFRED L. W. WILLIAMS.
WALTER J. BROWN.

(References on following page)

REFERENCES CITED

The following references are of record in the file of this patent:

UNITED STATES PATENTS

| Number | Name | Date |
|---|---|---|
| 107,432 | Zeigler | Sept. 13, 1870 |
| 220,111 | Baker | Sept. 30, 1879 |
| 761,317 | McCall | May 31, 1904 |
| 1,316,936 | Blackmarr | Sept. 23, 1919 |
| 1,737,019 | Nicolson | Nov. 26, 1929 |
| 1,766,043 | Nicolson | June 24, 1930 |
| 1,861,166 | Sieber | May 31, 1932 |
| 1,955,471 | Pooler | Apr. 17, 1934 |
| 1,975,517 | Nicolson | Oct. 2, 1934 |
| 1,995,270 | Wallace | Mar. 19, 1935 |
| 2,170,318 | Cady | Aug. 22, 1939 |

FOREIGN PATENTS

| Number | Country | Date |
|---|---|---|
| 276,037 | England | Dec. 1, 1927 |
| 691,320 | France | July 8, 1930 |